US005283772A

United States Patent [19]

Miyake et al.

[11] Patent Number: 5,283,772

[45] Date of Patent: Feb. 1, 1994

[54] OPTICAL HEAD

[75] Inventors: Takahiro Miyake; Yoshio Yoshida; Yukio Kurata, all of Tenri; Hideaki Sato, Yamatokoriyama, all of Japan

[73] Assignee: Sharp Kabushiki Kaisha, Osaka, Japan

[21] Appl. No.: 65,458

[22] Filed: May 20, 1993

Related U.S. Application Data

[63] Continuation of Ser. No. 697,330, May 8, 1991, abandoned.

[30] Foreign Application Priority Data

May 15, 1990 [JP] Japan ................................ 2-125139

[51] Int. Cl.[5] ................................................ G11B 7/09

[52] U.S. Cl. .............................. 369/44.23; 369/44.41; 369/112

[58] Field of Search .................... 369/13, 44.12, 44.14, 369/44.23, 44.24, 44.41, 44.42, 112

[56] References Cited

U.S. PATENT DOCUMENTS 4,817,074 3/1989 Yamanaka ........................ 369/44.24
5,115,423 5/1992 Maeda et al. ................ 369/44.12 X

FOREIGN PATENT DOCUMENTS 0311463 4/1989 European Pat. Off. .
0315744 5/1989 European Pat. Off. .
2205678 12/1988 United Kingdom .

OTHER PUBLICATIONS

Microoptics News, Hodic Circular, The Japan Society of Applied Physics, May 26, 1989, vol. 7, No. 2.
CD Pickup Using a Holographic Optical Element, The Japan Society of Precision Engineering (JSPE)-56-10 '90-10-1775.

*Primary Examiner*—W. R. Young
*Attorney, Agent, or Firm*—David G. Conlin; George W. Neuner

[57] ABSTRACT

An optical head comprising a diffracting element having two tracking diffracting regions separated by a division line extending in a direction corresponding to a track direction of a recording medium, and one focusing diffracting region separated from the tracking diffracting regions by a division line extending in a direction corresponding to a radial direction of the recording medium. The optical head further comprises a light receiving element having two tracking light receiving regions for receiving diffracted lights produced in the tracking diffracting regions, and two adjoining focusing light receiving regions for receiving a diffracted light produced in the focusing diffracting region. The diffracted light produced in the focusing diffracting region always has a substantially constant light intensity, even when a tracking error occurs. As a result, an offset can be prevented from occurring in a focus error signal by finely adjusting the diffracting element.

12 Claims, 8 Drawing Sheets

OPTICAL HEAD

This is a continuation of copending application(s) Ser. No. 07/697,330 filed on May 8, 1991, now abandoned.

FIELD OF THE INVENTION

The present invention relates to an optical head for use in optical data reproduction apparatuses adopted for reading data from Read-Only type optical disks such as so-called compact disks, laser disks, etc., and in optical data recording/reproduction apparatuses adopted for recording and reading data on/from Direct Read after Write type or Rewritable type optical disks.

BACKGROUND OF THE INVENTION

FIG. 8 shows an example of optical head used in conventional optical data reproduction apparatuses and optical data recording/reproduction apparatuses.

A light beam is projected from a semiconductor laser 1, diffracted in a diffracting element 2 and split into a zero-order diffracted light (main beam) and ±1 order diffracted lights (a pair of sub beams). In FIG. 8, the ±1 order diffracted lights are comprised in a plane orthogonal to the surface of the paper.

The main beam and the sub beams are further diffracted in a diffracting element 3. Zero-order diffracted lights respectively produced by the main beam and the sub beams are transmitted through a collimating lens 4 to be focused onto a recording medium 6 by an objective lens 5.

Return lights reflected off the recording medium 6 pass through the objective lens 5 and the collimating lens 4, and are diffracted in the diffracting element 3. First order diffracted lights are then directed onto a light receiving element 7 from which data signal, tracking error signal and error focus signal can be obtained.

When, for example, data is recorded in the form of physical pits on the disc-shaped recording medium 6, the data is read out by focusing the zero order diffracted light produced by the main beam in the diffracting element 3 on the physical pits. The return light of the zero order diffracted light is diffracted again in the diffracting element 3 to produce first order diffracted lights. The data signal is derived from the intensity of these first order diffracted lights.

The zero order diffracted lights produced by the two sub beams in the diffracting element 3 are focused on positions symmetrical with respect to the zero order diffracted light produced by the main beam in the diffracting element 3. These positions are offset greatly in a track direction and offset slightly in a radial direction from the position on the recording medium 6 where the zero order diffracted light of the main beam is focused. The return lights are respectively diffracted in the diffracting element 3 to produce first order diffracted lights. The tracking error signal is derived from the intensities of these first order diffracted lights.

FIG. 9 shows the diffracting element 3 as seen from the recording medium 6. As shown in FIG. 9, the diffracting element 3 is divided into two diffracting regions 3a and 3b that are delineated by a division line 3e and whereon gratings 3c and 3d are respectively formed. The gratings 3c and 3d have mutually different pitches and the directions thereof are orthogonal to the division line 3e. Here, the direction of the division line 3e is set so as to coincide with the radial direction of the recording medium 6.

As shown in FIG. 10, the light receiving element 7 is divided into five light receiving regions 7a to 7e.

When the light beam projected from the semiconductor laser 1 is precisely focused on the recording medium 6, a portion of the return light corresponding to the zero order diffracted light produced by the main beam in the diffracting element 3, is diffracted in the diffracting region 3a of the diffracting element 3 to produce a first order diffracted light. This first order diffracted light is focused on a division line 7f separating the light receiving regions 7a and 7b, to form a spot-shaped diffracted image $Q_1$. Another portion of the return light corresponding to the zero order diffracted light of the main beam produced in the diffracting element 3, is diffracted in the diffracting region 3b of the diffracting element 3 to produce a first order diffracted light. This first order diffracted light is focused on the light receiving region 7c to form a spot-shaped diffracted image $Q_2$. The return lights corresponding to the zero order diffracted lights produced by the two sub beams in the diffracting element 3, respectively form two spot-shaped diffracted images $Q_3$ and $Q_4$ and two spot-shaped diffracted images $Q_5$ and $Q_6$ on the light receiving regions 7d and 7e.

Supposing that $S_{1a}$ to $S_{1e}$ respectively represent output signals released from the light receiving regions 7a to 7e, the focus error signal may be obtained by calculating $(S_{1a}-S_{1b})$. The tracking error signal may be obtained by calculating $(S_{1d}-S_{1e})$ and the data signal may be obtained by calculating $(S_{1a}+S_{1b}+S_{1c})$.

However, in a conventional system, the light beam projected from the semiconductor laser 1 is split into a main beam and two sub beams in the diffracting element 2 whereby the light intensity of the main beam is lower than that of the original light beam. Therefore, when the recording medium 6 employed is of a recordable type such as a Direct Read after Write type disk, a Rewritable disk, etc., and the main beam is used to perform recording, it is difficult to provide a sufficient light intensity.

A drop in the light intensity of the main beam causes the amount of light received by the light receiving element 7 to decrease. As a result, the detection of the data signal and the focus error signal becomes difficult whereby the recording and reproduction of data can not be performed accurately.

In order to prevent the light intensity of the main beam from decreasing, an alternative optical head that does not include the diffracting element 2 and where sub beams are not generated, can be adopted.

As shown in FIG. 11, with such an optical head, the light beam projected from the semiconductor laser 1 passes through the collimating lens 4 and the objective lens 5 and is focused at a point on the recording medium 6. The tracking error signal is derived from the light intensity distribution of the return light reflected off the recording medium 6.

Namely, as illustrated in FIG. 15, the light beam is converged by the objective lens 5 and forms a light spot 9 on the recording medium 6. When the light spot 9 is centralized on a track 8, the light intensity distribution of the return light is symmetrical at both sides of a center line $l_2-l_2$, as illustrated in FIG. 18. In FIG. 18, the section represented by hatching indicates sections having a low light intensity, and the center line $l_2-l_2$ corresponds to a center line $l_1-l_1$ of the light spot 9 shown in FIG. 15.

On the other hand, when, as shown in FIGS. 14 and 16, the light spot 9 is formed in a position displaced inwards or outwards from the center of the track 8, the light intensity distribution of the return light is not symmetrical at both sides of the center line $l_2$—$l_2$, as shown in FIGS. 17 and 19.

As shown in FIG. 12, in order to obtain the tracking error signal, provision is made such that a division line 3e' of a diffracting element 3' coincides with the track direction, i.e., is orthogonal to the radial direction.

As shown in FIG. 13, a light receiving element 7' is divided into three light receiving regions 7a' to 7c'.

A portion of the return light is diffracted in the diffracting region 3a' of the diffracting element 3' to produce a first order diffracted light. This first order diffracted light is focused on a division line 7d' separating the light receiving regions 7a' and 7b' to form a spot-shaped diffracted image $Q_1'$. Another portion of the return light is diffracted in the diffracting region 3a' of the diffracting element 3' and a first order diffracted light thereof is focused on the light receiving region 7c' to form a spot-shaped diffracted image $Q_2'$.

Supposing that $S_{2a}$ to $S_{2c}$ respectively represent output signals released from the light receiving regions 7a' to 7c', the focus error signal may be obtained by calculating $(S_{2a}-S_{2b})$. The tracking error signal may be obtained by calculating $(S_{2a}+S_{2b})-S_c$ and the data signal may be obtained by calculating $(S_a+S_{2b}+S_{2c})$.

However, it is difficult to obtain an accurate focus error signal with the optical head arranged as described above.

Namely, when the light beam is precisely focused on the recording medium 6, the diffracted images $Q_1$, and $Q_2$'formed on the light receiving element 7' are in theory spots. However in practice, due to differences in the performance of various optical members, tolerance at the time of assembly of the optical system or differences in the oscillation wavelength of the semiconductor laser 1, the diffracted images $Q_1'$ and $Q_2'$ spread to a certain extent, as shown in FIG. 20. This causes an offset to occur in the focus error signal when the focus is correct.

Here, in order to prevent the occurrence of an offset, one might consider to finely adjust the diffracting element 3' so that, as shown in FIG. 21, the diffracted image Q', is equally distributed in the light receiving regions 7a' and 7b'. In other terms, provision is made such that the light amounts respectively received by the light receiving regions 7a' and 7b' are equal.

However, as was discussed above, when the position of the light spot 9 is displaced from the center of the track 8, the light intensity distribution of the return light is not symmetrical at both sides of the center line $l_2$—$l_2$, as shown in FIGS. 17 and 19. As a result, the light intensity distribution of the return light impinging upon the diffracting element 3' is also uneven causing the light intensity distribution of the diffracted image $Q_1'$ to vary and the light amounts respectively received by the light receiving regions 7a' and 7b' to differ. A conventional optical head therefore presents the disadvantage that in the case of a tracking error, an offset occurs in the focus error signal even when the focus is correct thereby impeding an accurate focus adjustment.

SUMMARY OF THE INVENTION

An object of the present invention is to provide an optical head capable of accurately detecting a focus error even in the case that a tracking error occurred.

In order to achieve the above object, an optical head in accordance with the present invention is characterized in comprising a diffracting element having two tracking diffracting regions separated by a division line extending in a direction corresponding to a track direction of a recording medium, and one focusing diffracting region separated from the tracking diffracting regions by a division line extending in direction corresponding to a radial direction of the recording medium. The optical head further comprises a light receiving element having two tracking light receiving regions for respectively receiving diffracted lights produced in the tracking diffracting regions, and two adjoining focusing light receiving regions for receiving a diffracted light produced in the focusing diffracting region.

With the above arrangement, a return light reflected off the recording medium impinges upon the diffracting element to produce diffracted lights. The diffracted lights produced in the two tracking diffracting regions of the diffracting element are respectively received by the two tracking light receiving regions of the light receiving element. Tracking error detection is executed by comparing output signals released from the tracking light receiving regions.

On the other hand, the diffracted light produced in the focusing diffracting region of the diffracting element is received by the two adjoining focusing light receiving regions of the light receiving element. Focus error detection is executed by comparing output signals released from the focusing light receiving regions.

Here, the focusing diffracting region is separated from the tracking diffracting regions by a division line that extends in a direction corresponding to the radial direction of the recording medium. Such an arrangement enables the diffracted light produced in the focusing diffracting region to always have a substantially constant light intensity even in the case of a tracking error. Therefore, an offset may be prevented from occurring in the focus error signal by finely adjusting the diffracting element.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a schematic plan view illustrating a diffracting element.

FIG. 2 is a schematic plan view illustrating a light receiving element.

FIG. 3 is a schematic plan view illustrating how diffracted images spread on the light receiving element.

FIG. 4 is a schematic front view illustrating an optical head.

FIG. 5 is a schematic side view illustrating the optical head of FIG. 4.

FIG. 6 is a schematic plan view illustrating another diffracting element of this invention.

FIG. 8 is a schematic front view illustrating an optical head.

FIG. 9 is a schematic plan view illustrating a diffracting element.

FIG. 10 is a schematic plan view illustrating a light receiving element.

FIG. 11 is a schematic front view illustrating an optical head.

FIG. 12 is a schematic plan view illustrating a diffracting element.

FIG. 13 is a schematic plan view illustrating a light receiving element.

FIG. 14 through FIG. 16 are explanatory views respectively illustrating relative positions of a track and a light spot.

FIG. 17 through FIG. 19 are explanatory views respectively illustrating a light intensity distribution of a return light in accordance with the relative positions of the track and the light spot shown in FIGS. 14 to 16.

FIG. 20 is a schematic plan view illustrating how diffracted images spread on the light receiving element.

FIG. 21 is a schematic plan view illustrating how diffracted images spread on the light receiving element when the diffracting element is finely adjusted.

DESCRIPTION OF THE EMBODIMENTS

A first embodiment of the present invention will be described below with reference to FIG. 1 through FIG. 6.

Figure 4:
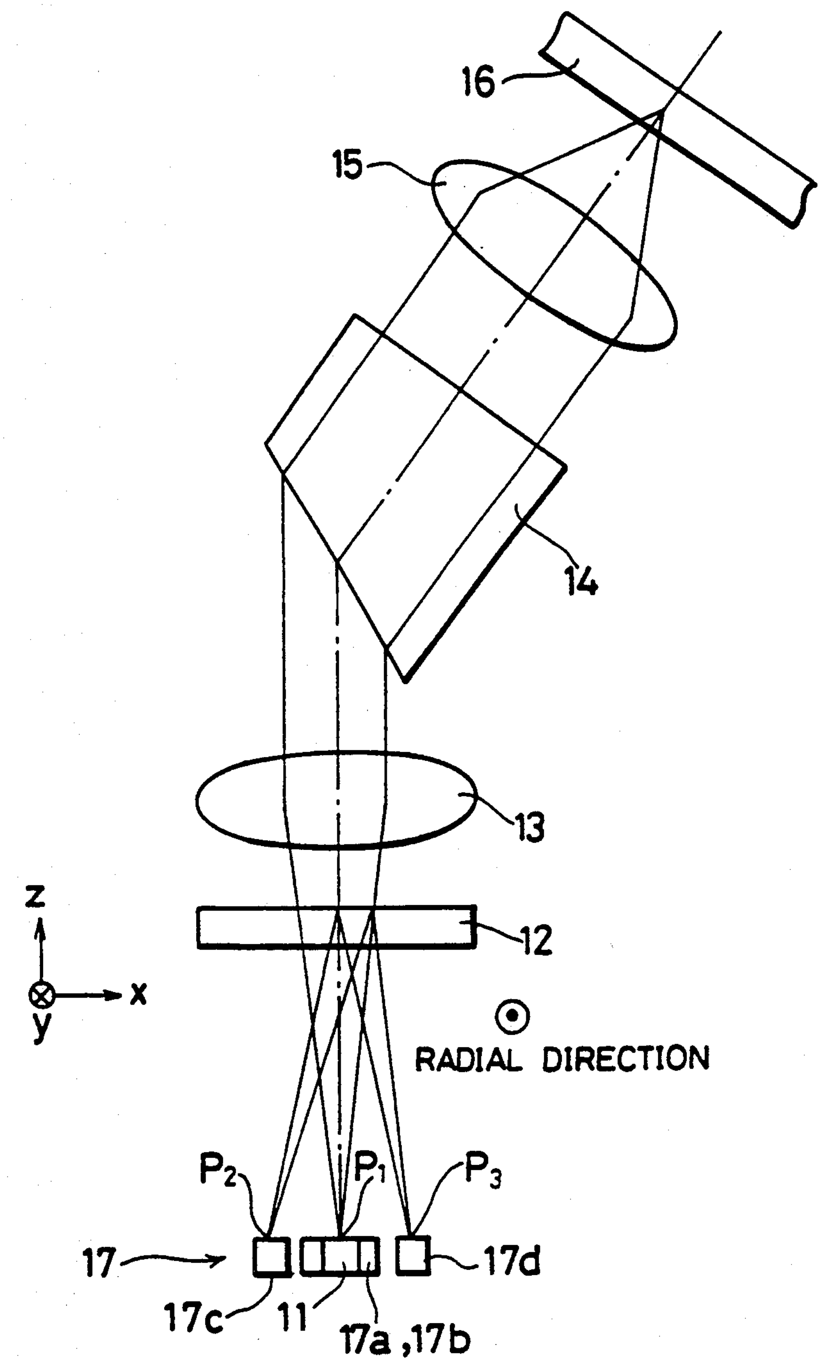
Figure 5:
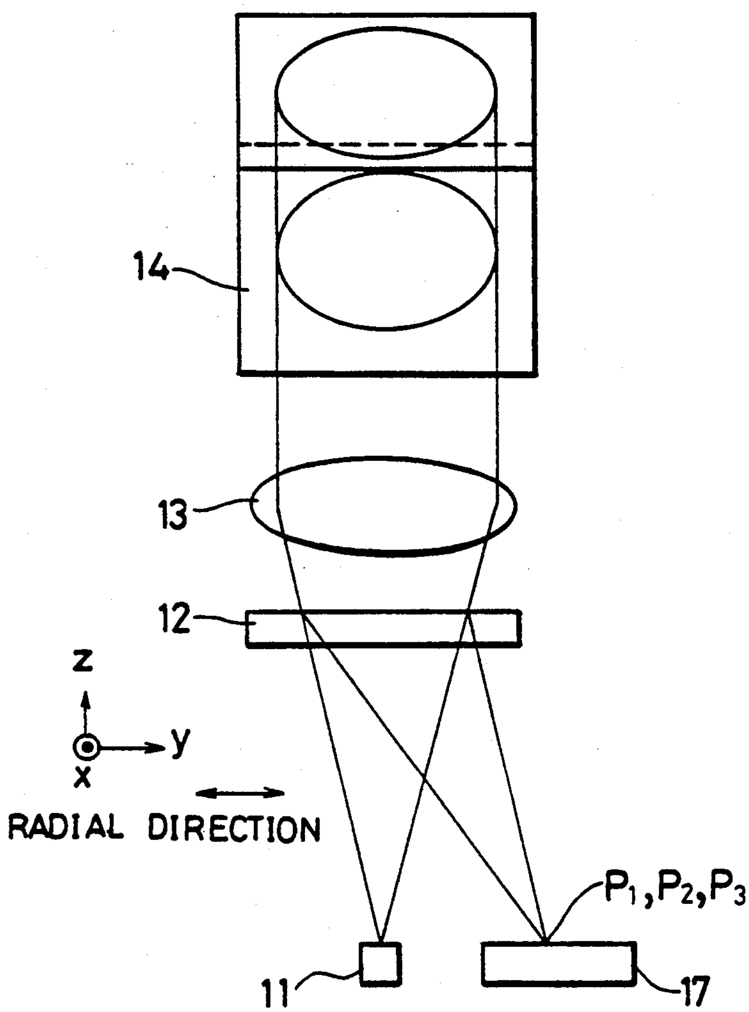

As shown in FIGS. 4 and 5, in an optical head of the present embodiment, a light beam is projected from a semiconductor laser 11 used as light source and is diffracted in a diffracting element 12. A zero order diffracted light passes through a collimating lens 13 (collimating means) where it converted from a diverging light into a collimated one, and impinges upon a shaping prism 14 (shaping means) thereafter. The shaping prism 14 is an optical member designed to improve the utilization efficiency of the power of the light beam and shapes a substantially elliptical light intensity distribution of the light beam projected from the semiconductor laser 11 into a substantially circular light intensity distribution. In the present embodiment, the light beam projected from the semiconductor laser 11 is expanded in a minor axis direction of the ellipse thereof (x direction in the figure) by the shaping prism 14.

After passing through the shaping prism 14, the light beam is focused on a recording medium 16 by an objective lens 15. The collimating lens 13, the shaping prism 14 and the objective lens 15 constitute an optical system.

Optical disks such as Read-Only type, Direct Read after Write type and Rewritable disks may be adopted as the recording medium 16. Tracks (not shown in the figure) composed of aligned pits, guiding grooves or the like are formed on the recording medium 16.

A return light reflected off the recording medium 16 is converged by the objective lens 15. Thereafter the light intensity distribution thereof is changed back by the shaping prism 14 into a substantially elliptical shape whose minor axis coincides with the x direction. The shaped return light passes through the collimating lens 13 and is directed to the diffracting element 12. The return light is diffracted in the diffracting element 12 to produce diffracted lights that are then directed to a light receiving element 17.

Figure 1:
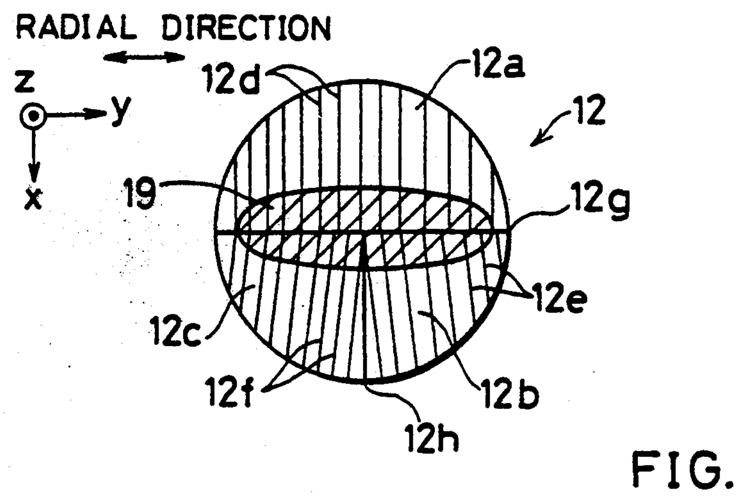
FIG. 1 through FIG. 6 illustrate a first embodiment of the present invention.

As shown in FIG. 1, the diffracting element 12 as seen from the recording medium 16, is divided by division lines 12g and 12h into three diffracting regions 12a to 12c. Gratings 12d to 12f are respectively formed on the diffracting regions 12a to 12c.

The division line 12g extends in a y direction corresponding to a radial direction of the recording medium 16. The division line 12h starts from the center of the division line 12g and extends in the x direction orthogonal to the radial direction of the recording medium 16, i.e., in a track direction of the recording medium 16. The diffracting regions 12b and 12c (tracking diffracting regions) are designed such as to have mutually equal areas. In addition, provision is made such that the area of the diffracting region 12a (focusing diffracting region) is equal to the sum of the areas of the diffracting regions 12b and 12c. A cross section 19 formed by the return light impinging upon the diffracting element 12 has a substantially elliptical shape. In the present embodiment, a major axis (y direction) of the cross section 19 coinciding with the direction of the division line 12g. In other words, the major axis of the return light corresponds to the radial direction of the recording medium 16.

Here, the radial direction is defined as a direction extending from the center of rotation of the recording medium 16 to a position where the light beam is irradiated on the recording medium 16. As for the track direction, it is defined as a direction on the recording medium 16 orthogonal to the radial direction. The direction corresponding to the radial direction is defined as a projection of the radial direction upon the diffracting element 12 while the direction corresponding to the track direction is defined as a projection of the track direction upon the diffracting element 12.

The grating 12d formed on the diffracting region 12a has a grating direction orthogonal to the division line 12g. A grating direction of the grating 12e formed on the diffracting region 12b and a grating direction of the grating 12f of the diffracting region 12c are inclined in mutually opposite directions with respect to the division line 12h. Here, the pitches of the gratings 12d to 12f and the inclination of the gratings 12e and 12f are respectively determined according to relative positions of the diffracting regions 12a to 12c and diffracted images $P_1$ to $P_3$, to be described later, formed on the light receiving element 17. In order to correct aberrations, grating lines of the gratings 12d and 12f can be designed, when necessary, so as to describe gradual curves.

Figure 2:
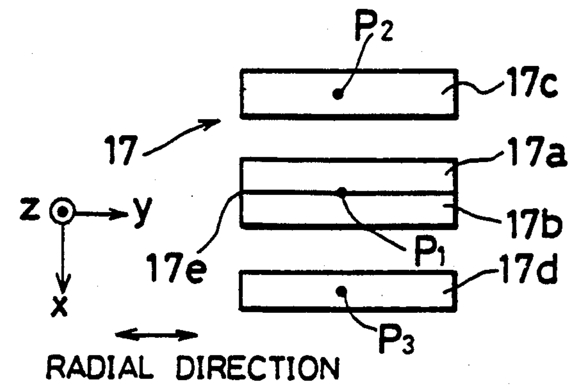

As shown in FIG. 2, the light receiving element 17 is divided into four rectangular light receiving regions 17a to 17d. The light receiving regions 17a to 17d are aligned in the x direction corresponding to the track direction of the recording medium 16 and extend in the y direction corresponding to the radial direction of the recording medium 16. The two central light receiving regions 17a and 17b (focusing light receiving regions) are divided by a division line 17e. The division line 17e extends in the y direction corresponding to the radial direction of the recording medium 16. The light receiving regions 17c and 17d (tracking light receiving regions) are respectively separated in the x direction from the light receiving regions 17a and 17b by a predetermined interval.

When the light beam projected from the semiconductor laser 11 is precisely focused upon the recording medium 16, the diffracted light produced in the diffracting region 12a of the diffracting element 12 forms the spot-shaped diffracted image $P_1$ on the division line 17e. Meanwhile, the diffracted light produced in the diffracting region 12b forms the spot-shaped diffracted image $P_2$ on the light receiving region 17c and the diffracted light produced in the diffracting region 12c forms the spot-shaped diffracted image $P_3$ on the light receiving region 17d.

When there is no focus error, the diffracted image $P_1$ is equally distributed between the light receiving regions 17a and 17b, and ideally forms one spot on the division line 17e. On the other hand, when a focus error occurred, the diffracted image $P_1$ spreads on either the light receiving region 17a or the light receiving region 17b. Therefore, supposing that Sa to Sd respectively represent output signals released from the light receiving regions 17a to 17d, the focus error signal may be obtained through a single knife edge method by calculating (Sa−Sb). The tracking error signal is obtained by comparing the respective light amounts of the diffracted lights from the diffracting regions 12b and 12c divided by the division line 12h extending in the x direction corresponding to the track direction of the recording medium 16, and calculating (Sc−Sd) through a push-pull method. In addition, the data signal is obtained by calculating (Sa+Sb+Sc+Sd).

Figure 3:
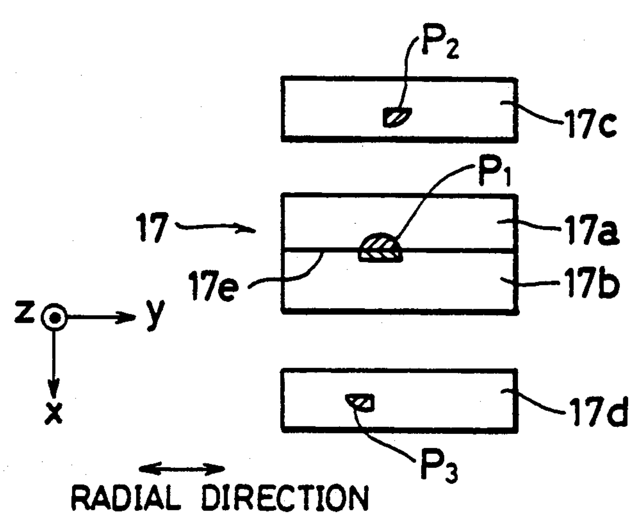

With the above configuration, tolerance of various members might cause the diffracted image $P_1$ to spread to a certain extent when the light beam projected from the semiconductor laser 11 is precisely focused on the recording medium 16. As shown in FIG. 3, in this case the diffracting element 12 should be finely adjusted so that the diffracted image $P_1$ is equally distributed between the light receiving regions 17a and 17b, i.e., so that the output signals Sa and Sb from the light receiving regions 17a and 17b are equal. Hence, in the present embodiment, even if the light intensity distribution of the return light impinging upon the diffracting element 12 varies due to a tracking error, this variation is in a direction parallel with the division line 12g. This enables the light amounts respectively received by the light receiving regions 17a and 17b whereon the diffracted image $P_1$ is formed b the diffracted light from the diffracting region 12a, to stay unchanged in spite of the variation in the light intensity distribution of the return light. As a result, a tracking error does not cause an offset in the focus error signal whereby the focus error signal can be accurately detected.

Moreover, in the present embodiment, the light beam projected from the semiconductor laser 11 is directed onto the recording medium 16 without being split into a main beam and sub beams whereby the light intensity of the projected light does not lower. Therefore, since the utilization efficiency of the projected light is high, the required light intensity can be readily ensured even when the recording medium 16 adopted is of a recordable type.

In the above embodiment, the diffracting element 12 was designed such that the area of the diffracting region 12a and the sum of the respective areas of the diffracting regions 12b and 12c are equal. However, the area of the diffracting region 12a and the sum of the respective areas of the diffracting regions 12b and 12c do not necessarily have to be equal. In addition, since the return light directed onto the diffracting element 12 has a substantially elliptical light intensity distribution, the diffracting element 12 may also be designed accordingly in an elliptical shape.

Figure 6:
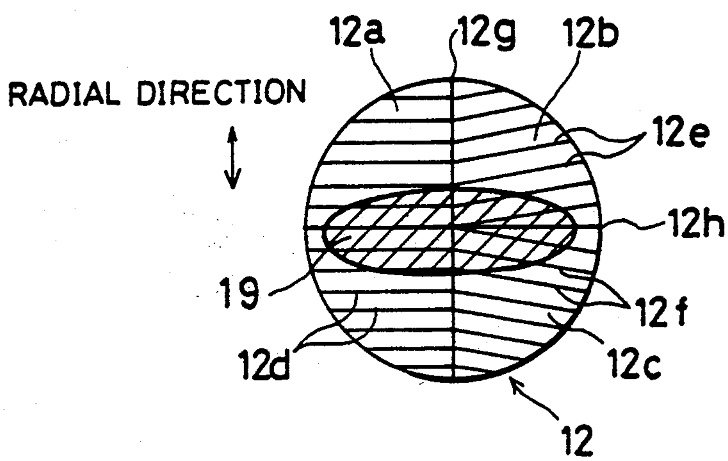

In the above embodiment, the direction (y direction) of the major axis of the cross section 19 of the return light directed onto the diffracting element 12, corresponds to the radial direction of the recording medium 16. As shown in FIG. 6, in the case that the major axis of the cross section 19 of the return light directed onto the diffracting element 12, corresponds to the direction orthogonal to the radial direction of the recording medium 16 (track direction), the diffracting element 12 of the above embodiment should be rotated by 90°. In addition, the light receiving element 17 of the above embodiment whose position is determined according to the semiconductor laser 11, should be rotated by 90°.

Figure 7:
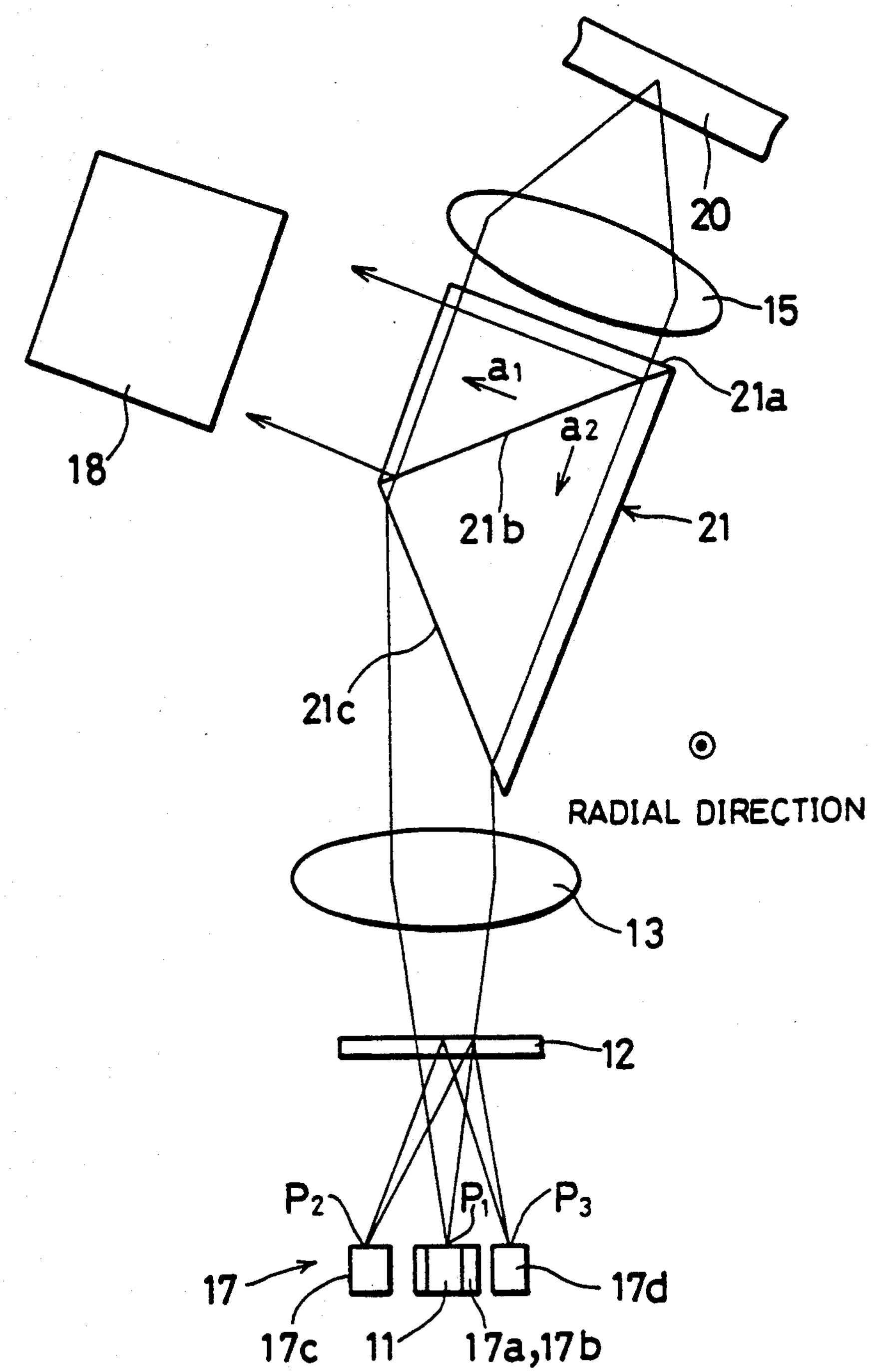
FIG. 7 is a schematic front view illustrating an optical head of a second embodiment of the present invention.
Figure 8:
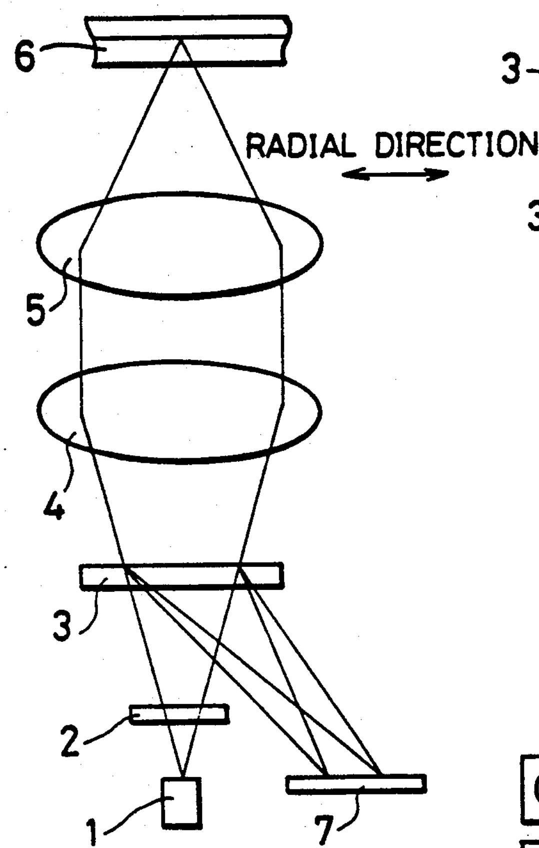
FIG. 8 through FIG. 10 illustrate a first conventional example.
Figure 9:
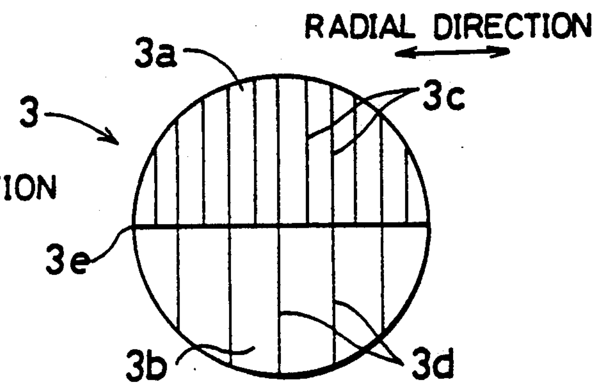
Figure 10:
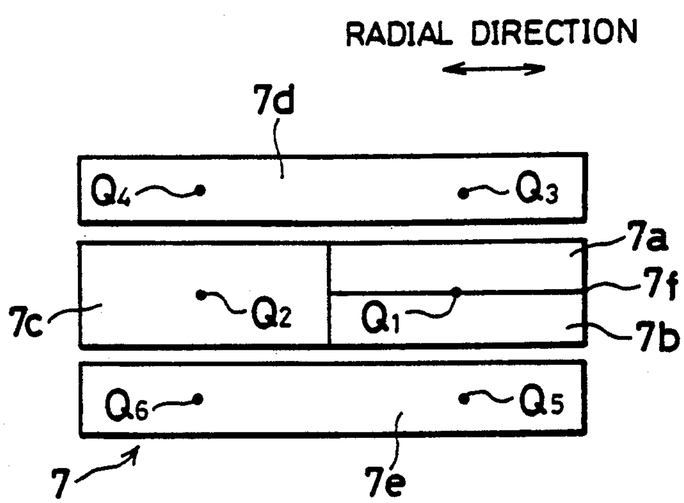
Figure 11:
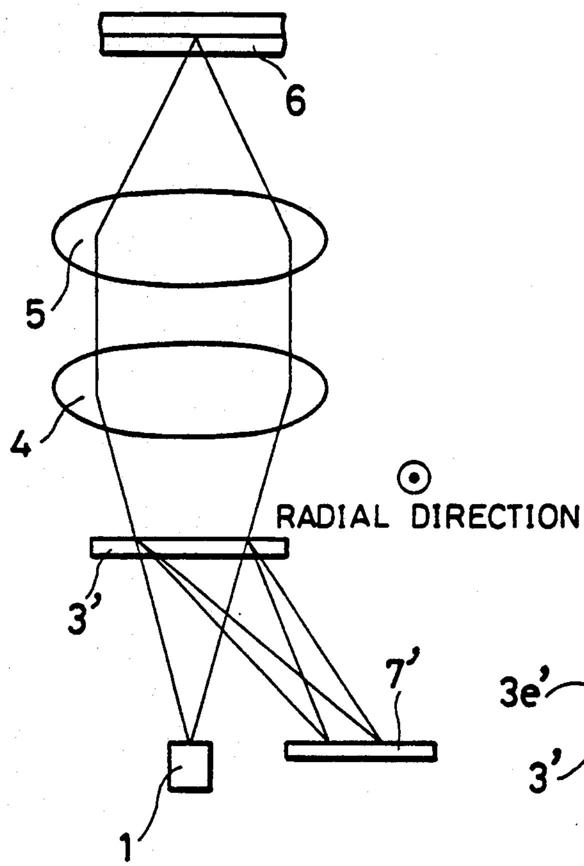
FIG. 11 through FIG. 21 illustrate a second conventional example.
Figure 12:
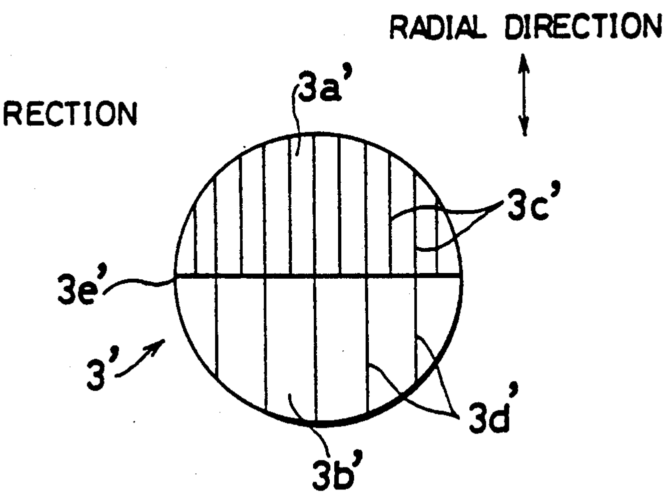
Figure 13:
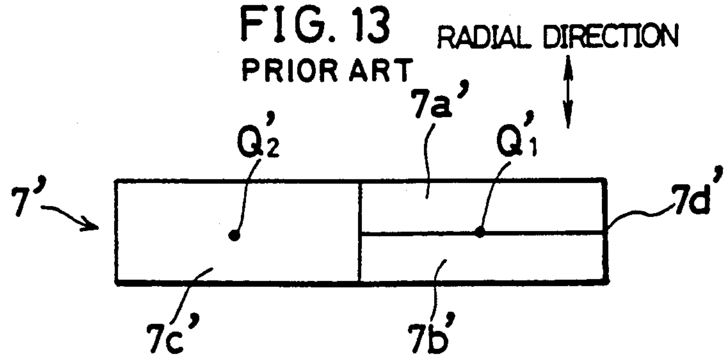
Figure 14:
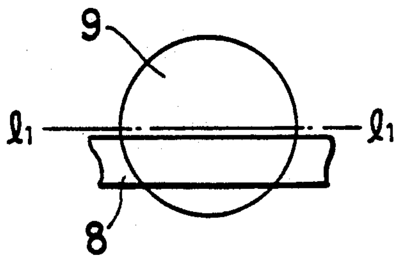
Figure 15:
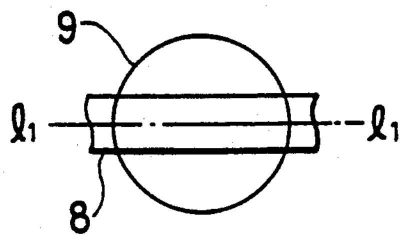
Figure 16:
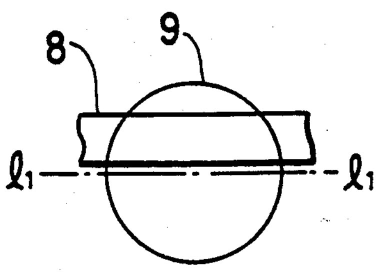
Figure 17:
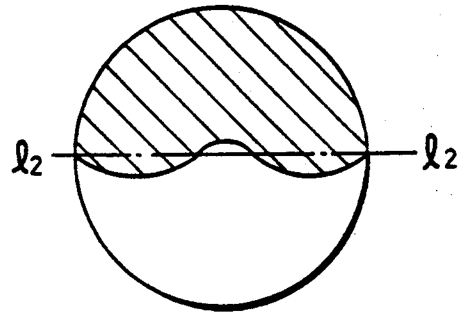
Figure 18:
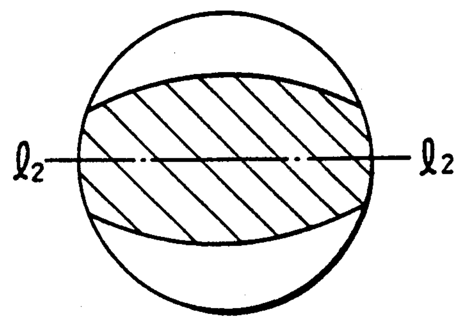
Figure 19:
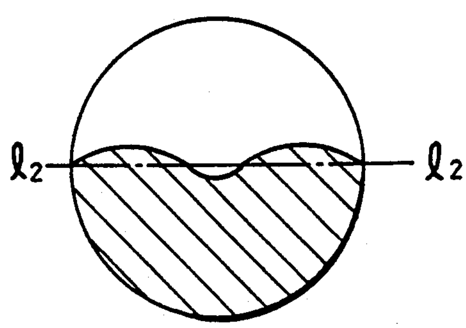
Figure 20:
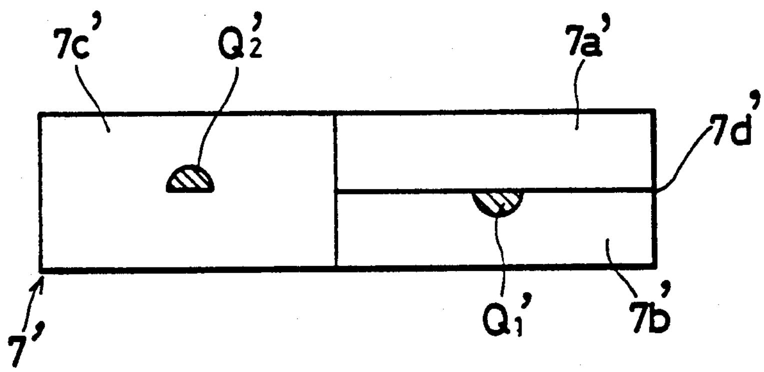
Figure 21:
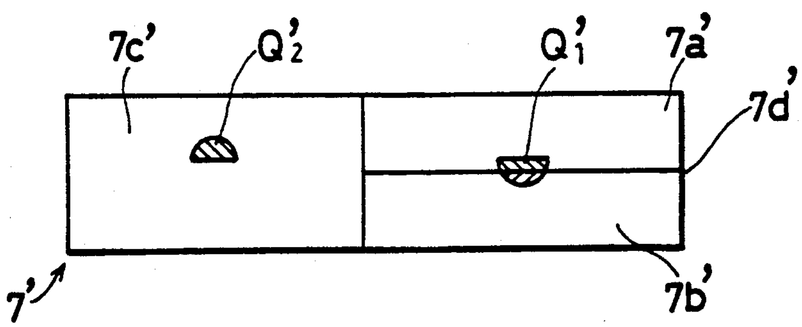

A second embodiment of the present invention will be discussed hereinafter with reference to FIG. 7. Here, the members having the same function as members shown in the figures of the aforementioned embodiment will be designated by the same code and their description will be omitted.

An optical head of the present embodiment is incorporated into a recording/reproducing apparatus for magneto-optical disk. A significant difference between the configuration discussed in the first embodiment and that of the present embodiment lies in the fact that, instead of the shaping prism 14 (see FIG. 4), the present embodiment adopts a polarizing beam splitter 21 (polarizing element) having a light beam shaping function. The polarizing beam splitter 21 is designed such that surfaces 21a and 21c whereon light impinges or wherefrom light goes out, are not parallel but form an intersection having a predetermined angle to shape the light beam shape.

A light beam is projected from a semiconductor laser 11, passes through a diffracting element 12 and a collimating lens 13 and is directed onto the polarizing beam splitter 21 where the substantially elliptical light intensity distribution thereof is shaped into a substantially circular light intensity distribution. Thereafter, the light beam is focused onto a magneto-optical disk 20 adopted as recording medium by means of an objective lens 15.

A polarization plane of a return light reflected off the magneto-optical disk 20 is rotated through a magnetic Kerr effect. Namely, the polarization plane of the return light is rotated in mutually opposite directions depending on whether the magnetization of a magnetic domain formed on the magneto-optical disk 20 and constituting a unit adopted for recording data, is oriented upward or downward.

The return light passes through the objective lens 15 and impinges upon the surface 21a of the polarizing beam splitter 21. A polarized component containing a data component of the return light whose polarization plane was rotated and modulated, is reflected off a boundary surface 21b at right angles ($a_1$ direction in the figure) and is directed to an optical system for data signal detection 18.

Meanwhile, another polarized component of the return light, i.e., the polarized component that does not contain the data component, is transmitted through the boundary surface 21b in a $a_2$ direction. After the substantially circular light intensity distribution thereof is shaped back into a substantially elliptical light intensity distribution at the surface 21c of the polarizing beam splitter 21, the transmitted polarized component passes through the collimating lens 13 and is directed onto the diffracting element 12.

The configurations of the diffracting element 12 and of a light receiving element 17 are analogous to those discussed in the first embodiment. The return light impinging upon the diffraction element 12 is diffracted in diffracting regions 12a to 12c (not shown in FIG. 7) to produce diffracted lights that are then directed onto the light receiving element 17. A focus error signal and a tracking error signal are obtained in the same manner as in the first embodiment. In the present embodiment, the detection of the data signal is performed in the optical system for data signal detection 18 and not in the light receiving element 17.

The polarizing beam splitter 21 adopted in the optical head of the present embodiment, possesses a light beam shaping function whereby the implementation of a shaping prism is not necessary. This enables to design a compact and light optical head for use with a recording/reproducing apparatus for magneto-optical disk. Other functions and effects of the optical head of the present embodiment are similar to those discussed in the previous embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical head comprising:

a light source;

focusing means for focusing a light projected from the light source onto a recording medium;

an optical path between the light source and the focusing means;

a diffracting element for diffracting a return light reflected off the recording medium in a direction different from the light source, said diffracting element being disposed in the optical path between the light source and the focusing means; and a light receiving element for receiving diffracted lights from the return light diffracted in the diffracting element to detect a focusing error and a tracking error, said diffracting element including two tracking diffracting regions separated by a first division line, said first division line extending in a direction corresponding to a track direction of the recording medium; and one focusing diffracting region separated from said tracking diffracting regions by a second division line, said second division line extending in a direction corresponding to a radial direction of the recording medium, said light receiving element including two tracking light receiving regions, said two tracking light receiving regions respectively receiving the diffracted lights diffracted from the tracking diffracting regions of the diffracting element; and two adjoining focusing light receiving regions for receiving the diffracted light diffracted from the focusing diffracting region of the diffracting element.

2. An optical head as defined in claim 1 further comprising collimating means for converting the light projected from the light source into a collimated light, said collimating means being disposed between the diffracting element and the focusing means in the optical path.

3. An optical head as defined in claim 2 further comprising shaping means for shaping a light intensity distribution of the light projected from the light source into a substantially circular light intensity distribution, said shaping means being disposed between the collimating means and the focusing means in the optical path.

4. An optical head as defined in claim 1 further comprising:

a polarizing element for separating the return light reflected off the recording medium into polarized components, said polarizing element being disposed between the diffracting element and the focusing means in the optical path; and an optical system for data signal detection for receiving one of the polarized components separated by the polarizing element to detect a data signal.

5. An optical head as defined in claim 4 further comprising collimating means for converting the light projected from the light source into a collimated light, said collimating means being disposed between the diffracting element and the polarizing element in the optical path.

6. An optical head as defined in claim 5 further comprising shaping means for shaping a light intensity distribution of the light projected from the light source into a substantially circular light intensity distribution, said shaping means being disposed between the collimating means and the polarizing element in the optical path.

7. An optical head as defined in claim 1, wherein a direction of a boundary line separating the two adjoining focusing light receiving regions of the light receiving element is set so that said boundary line and an optical axis of the diffracted light produced in the focusing diffracting region of the diffracting element, are comprised in a same plane.

8. An optical head as defined in claim 1, wherein gratings respectively formed on the two tracking diffracting regions of the diffracting element, are inclined in mutually opposite directions with respect to the division line extending in the direction corresponding to the track direction.

9. An optical head comprising:

a light source;

focusing means for focusing a light projected from the light source onto a recording medium;

a diffracting element for diffracting a return light reflected off the recording medium in a direction different from the light source, said diffracting element being disposed in an optical path between the light source and the focusing means; and a light receiving element for receiving diffracted lights from the return light diffracted in the diffracting element to detect a focusing error and a tracking error, a polarizing element for separating the return light reflected off the recording medium into polarized components, said polarizing element being disposed in an optical path between the diffracting element and the focusing means;

an optical system for data signal detection for receiving one of the polarized components separated by the polarizing element to detect a data signal;

collimating means for converting the light projected from the light source into a collimated light, said collimating means being disposed in an optical path between the diffracting element and the polarizing element; and shaping means for shaping a light intensity of the light projected from the light source into a substantially circular light intensity distribution, said shaping means being disposed in an optical path between the collimating means and the polarizing element;

said diffracting element including, two tracking diffracting regions separated by a division line, said division line extending in a direction corresponding to a track direction of the recording medium; and one focusing diffracting region separated by a division line, said division line extending in a direction corresponding to a radial direction of the recording medium, said light receiving element including, two tracking light receiving regions, said two tracking light receiving regions respectively receiving the diffracted lights diffracted from the tracking diffracting regions of the diffracting element; and two adjoining focusing light receiving regions for receiving the diffracted light diffracted from the focusing diffracting region of the diffracting element;

wherein the polarizing element and the shaping means are formed integrally.

10. An optical head comprising:

a light source;

focusing means for focusing a light projected from the light source onto a recording medium;

an optical path between the light source and the focusing means;

a diffracting element for diffracting a return light reflected off the recording medium in a direction different from the light source, said diffracting element being disposed in the optical path between the light source and the focusing means; and a light receiving element for receiving diffracted lights from the return light diffracted in the diffracting element to detect a focusing error and a tracking error, said diffracting element including two tracking diffracting regions vertically separated by a first division line, said first division line extending in a horizontal direction and corresponding to a track direction of the recording medium; and one focusing diffracting region separated from said tracking diffracting regions by a second division line, said second division line extending in a direction corresponding to a radial direction of the recording medium, said light receiving element including two tracking light receiving regions, said two tracking light receiving regions respectively receiving the diffracted lights diffracted from the tracking diffracting regions of the diffracting element; and two adjoining focusing light receiving regions for receiving the diffracted light diffracted from the focusing diffracting region of the diffracting element.

11. An optical head comprising:

a light source;

focusing means for focusing a light projected from the light source onto a recording medium;

an optical path between the light source and the focusing means;

a diffracting element for diffracting a return light reflected off the recording medium in a direction different from the light source, said diffracting element being disposed in the optical path between the light source and the focusing means; and a light receiving element for receiving diffracted lights from the return light diffracted in the diffracting element to detect a focusing error and a tracking error, said diffracting element including two tracking diffracting regions separated by a first division line, said first division line extending in a direction corresponding to a track direction of the recording medium; and one focusing diffracting region separated from said tracking diffracting regions by a second division line, said second division line extending in a direction corresponding to a radial direction of the recording medium, said light receiving element including two tracking light receiving regions, said two tracking light receiving regions respectively receiving the diffracted lights diffracted from the tracking diffracting regions of the diffracting element; and two adjoining focusing light receiving regions for receiving the diffracted light diffracted from the focusing diffracting region of the diffracting element;

wherein a direction of a boundary line separating the two adjoining focusing light receiving regions of the light receiving element is set so that said boundary line and an optical axis of the diffracted light produced in the focusing diffracting region of the diffracting element are in a same plane; and wherein said two tracking light receiving regions are disposed apart from each other in a direction perpendicular to said boundary line.

12. An optical head comprising:

a light source;

focusing means for focusing a light projected from the light source onto a recording medium;

an optical path between the light source and the focusing means;

a diffracting element for diffracting a return light reflected off the recording medium in a direction different from the light source, said diffracting element being disposed in the optical path between the light source and the focusing means; and a light receiving element for receiving diffracted lights from the return light diffracted in the diffracting element to detect a focusing error and a tracking error;

wherein a zero-order diffracted light is projected onto the recording medium and a first-order diffracted light is received by said light receiving element;

said diffracting element including two tracking diffracting regions separated by a first division line, said first division line extending in a direction corresponding to a track direction of the recording medium; and one focusing diffracting region separated from said tracking diffracting regions by a second division line, said second division line extending in a direction corresponding to a radial direction of the recording medium, said light receiving element including two tracking light receiving regions, said two tracking light receiving regions respectively receiving the diffracted lights diffracted from the tracking diffracting regions of the diffracting element; and two adjoining focusing light receiving regions for receiving the diffracted light diffracted from the focusing diffracting region of the diffracting element.

* * * * *